(12) United States Patent
Ding et al.

(10) Patent No.: US 8,964,225 B2
(45) Date of Patent: Feb. 24, 2015

(54) PRINTING CONTROL METHOD, PRINTING CONTROL DEVICE AND PRINTING DEVICE WITH PRINTING DATA PRINTED ACCORDING TO HEIGHT OF ANOTHER BLANK SPACE

(75) Inventors: Jinfeng Ding, Shandong (CN); Yuguo Wang, Shandong (CN); Xuejun Zhang, Shandong (CN); Lei Che, Shandong (CN)

(73) Assignee: Shandong New Beiyang Information Technology Co., Ltd. (CN)

( * ) Notice: Subject to any disclaimer, the term of this patent is extended or adjusted under 35 U.S.C. 154(b) by 0 days.

(21) Appl. No.: 13/881,541

(22) PCT Filed: Oct. 18, 2011

(86) PCT No.: PCT/CN2011/080901
§ 371 (c)(1),
(2), (4) Date: Apr. 25, 2013

(87) PCT Pub. No.: WO2012/055329
PCT Pub. Date: May 3, 2012

(65) Prior Publication Data
US 2013/0215468 A1    Aug. 22, 2013

(30) Foreign Application Priority Data
Oct. 25, 2010   (CN) .......................... 2010 1 0518843

(51) Int. Cl.
*G06F 3/12*   (2006.01)
*G06K 15/02*  (2006.01)
(Continued)

(52) U.S. Cl.
CPC ................. *G06K 15/02* (2013.01); *H04N 1/38* (2013.01);
(Continued)

(58) Field of Classification Search
USPC .................. 358/1.15, 1.1, 449; 710/8; 347/22
See application file for complete search history.

(56) References Cited

U.S. PATENT DOCUMENTS

2005/0160194 A1*  7/2005  Bango et al. ...................... 710/8
2009/0262394 A1* 10/2009  Adachi et al. ................. 358/1.15

FOREIGN PATENT DOCUMENTS

JP    2000-289284    10/2000
JP    2009-295070    12/2009

OTHER PUBLICATIONS

Adachi T et al., Printer driver for use with roll sheet printer, conveys recording paper until relative migration distance that corresponds with paper length is acquired, Dec. 17, 2009, JP 2009295070 A.*

(Continued)

*Primary Examiner* — Martin Mushambo
(74) *Attorney, Agent, or Firm* — McAndrews, Held & Malloy, Ltd.

(57) ABSTRACT

The disclosure provides a printing control method, a printing control device and a printing device with printing data printed according to height of another blank space. The printing control method comprises the following steps: receiving printing data; acquiring first printing format information of the printing data, wherein the first printing format information includes a first blank space height; acquiring paper-saving parameter information; obtaining second printing format information according to the first printing format information and the paper-saving parameter information, wherein the second printing format information includes a second blank space height; and printing the printing data according to the second blank space height. With the disclosure, a significant paper-saving effect can be achieved during printing.

5 Claims, 5 Drawing Sheets

(51) Int. Cl.
*H04N 1/38* (2006.01)
*B41J 11/42* (2006.01)
*B41J 29/44* (2006.01)

(52) U.S. Cl.
CPC ............ *G06F 3/1219* (2013.01); *G06F 3/1251* (2013.01); *G06F 3/1284* (2013.01); *B41J 11/42* (2013.01); *B41J 29/44* (2013.01)
USPC ............... 358/1.15; 358/1.1; 358/449; 710/8; 347/22

(56) References Cited

OTHER PUBLICATIONS

International Search Report for International Patent Application No. PCT/CN2011/080901, mailed Jan. 19, 2012.

\* cited by examiner

PRINTING CONTROL METHOD, PRINTING CONTROL DEVICE AND PRINTING DEVICE WITH PRINTING DATA PRINTED ACCORDING TO HEIGHT OF ANOTHER BLANK SPACE

FIELD OF THE INVENTION

The disclosure relates to the field of printing, and in particular to a printing control method, a printing control device and a printing device with printing data printed according to height of another blank space.

BACKGROUND OF THE INVENTION

Printer has been widely used in people's life and work. People record data on paper using a printer so as to transfer or save information, for example, printing office documents, supermarket billing details, telephone bill and the like. Generally, to facilitate reading, the data is output onto printing paper in a pre-set format, wherein the pre-set format includes character height, character interval and line spacing; therefore, the more the character is printed, the more the paper is used. With the increased awareness in energy conservation and environment protection, more and more users require the printer to have a paper-saving printing function so as to save printing paper.

At present, in order to achieve the purpose above, a Japanese patent of which the publication number is JP2000289284 provides a printing control system, wherein this printing system further includes a final line verification device that is configured to adjust the character interval of a previous line or the line before the previous line to print the characters of the final line by putting them into the previous line when the original final line to be printed has a few characters; and a final page verification device that is configured to adjust the line spacing in a previous page or the page before the previous page to print the lines of the final page by putting them into the previous page when the original final page to be printed has a few lines.

The inventor finds that the printing system above has defects as follows: it can save one line of printing paper only when the final line to be printed has a few characters, or save one page of printing paper only when the final page to be printed has a few lines; thus, the paper-saving effect is not obvious.

SUMMARY OF THE INVENTION

The disclosure is provided in view of the problem in relevant art that paper can not be saved effectively when a printing device performs printing; therefore, the main purpose of the disclosure is to provide a printing control method, a printing control device and a printing device with printing data printed according to height of another blank space to solve the problem above.

In order to achieve the purpose above, a printing control method is provided according to one aspect of the disclosure. The printing control method includes: receiving printing data; acquiring first printing format information of the printing data, wherein the first printing format information includes a first blank space height; acquiring paper-saving parameter information; obtaining second printing format information according to the first printing format information and the paper-saving parameter information, wherein the second printing format information includes a second blank space height; and printing the data according to the second blank space height.

In order to achieve the purpose above, a printing control device is provided according to another aspect of the disclosure. The printing control device includes: a receiving module, which is configured to receive printing data; a first acquisition module, which is configured to acquire first printing format information of the printing data, wherein the first printing format information includes a first blank space height; a second acquisition module, which is configured to acquire paper-saving parameter information; a calculation module, which is configured to obtain second printing format information according to the first printing format information and the paper-saving parameter information, wherein the second printing format information includes a second blank space height; and a printing module, which is configured to print the data according to the second blank space height.

In order to achieve the purpose above, a printing device is provided according to another aspect of the disclosure. The printing device includes a printing mechanism which is configured to execute the printing operation; and the printing device further includes a controller which is configured to: receive printing data, acquire first printing format information of the printing data and paper-saving parameter information, wherein the first printing format information includes a first blank space height; obtain second printing format information according to the first printing format information and the paper-saving parameter information, wherein the second printing format information includes a second blank space height; and control the printing mechanism to print the data according to the second blank space height.

With the disclosure, the consumption of printing paper is greatly reduced by reducing the length of blank paper without narrowing the size of characters, through the following steps: receiving printing data; acquiring first printing format information of the printing data, wherein the first printing format information includes a first blank space height; acquiring the paper-saving parameter information; obtaining second printing format information according to the first printing format information and the paper-saving parameter information, wherein the second printing format information includes a second blank space height; and printing the data according to the second blank space height. Thus, the problem in relevant art that paper can not be saved effectively when a printing device performs printing is solved, and a significant paper-saving effect is achieved during printing.

BRIEF DESCRIPTION OF THE DRAWINGS

For a better understanding of the disclosure, accompanying drawings described hereinafter are provided to constitute one part of the application; the schematic embodiments of the disclosure and the description thereof are used to illustrate the disclosure but to limit the disclosure improperly. In the accompanying drawings.

DETAILED DESCRIPTION OF THE EMBODIMENTS

It should be noted that the embodiments in the application and the characteristics of the embodiments can be combined if no conflict is caused. The disclosure is described below in detail by reference to the accompanying drawings in conjunction with embodiments.

Figure 1:
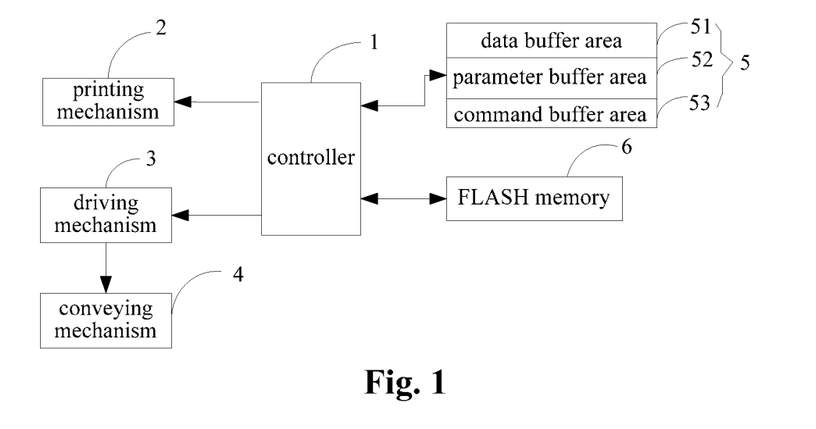
FIG. 1 shows a block diagram of a printing device according to an embodiment of the disclosure.

FIG. 1 shows a block diagram of a printing device provided by the embodiment of the disclosure. As shown in FIG. 1, the printing device includes a printing mechanism 2 and a controller 1, wherein the printing mechanism 2 is configured to execute the printing operation; and the controller 1 is configured to: receive printing data, acquire first printing format information of the printing data and paper-saving parameter information, wherein the first printing format information includes a first blank space height, obtain second printing format information according to the first printing format information and the paper-saving parameter information, wherein the second printing format information includes a second blank space height, and control the printing mechanism to print the printing data according to the second blank space height.

In the above, the blank space height information, that is, the first blank space height and the second blank space height, can be any one or more information of margin-top, line spacing and margin-bottom.

In this embodiment, the printing format information corresponding to the received printing data is processed, that is, the second printing format information which is more efficient in paper saving is obtained according to the original first printing format information; and the blank space height corresponding to the second printing format information is reduced, thus, a significant paper-saving effect can be achieved.

Preferably, besides the printing mechanism 2 and the controller 1, the printing device may further include a driving motor 3, a conveying mechanism 4, a RAM memory 5 and a FLASH memory 6. The controller 1 is connected with an external control device (such as a host) to receive printing data and various configuration parameters sent from the external control device. The printing mechanism 2 includes a printing head and a platen set opposite the printing head, wherein the printing head is electrically connected with the controller 1 to print characters on printing paper. Since the way adopted to implement the printing function does not affect the implementation of the disclosure, the printing mechanism 2 can be a thermal printing mechanism, a thermal transfer printing mechanism, a dot matrix printing mechanism, an ink jet printing mechanism and the like. The driving motor 3 is electrically connected with the controller 1, and is in transmission connection with the conveying mechanism 4 to supply power to the conveying mechanism 4. The conveying mechanism 4 is configured to drive printing paper to move inside a paper channel in the printing device. The RAM memory 5 is connected with the controller 1 to serve as a printing buffer memory and store the received printing data temporarily. The printing data includes character information, printing format information and printing control command. In the above, the printing format information includes character height, character interval, character pattern, blank space height and other parameters, and further, the blank space height further includes margin-top, margin-bottom, line spacing and other parameters; the printing control command includes line feed command, paper conveying command, paper output command (including cutting command) and the like. The RAM memory 5 includes a data buffer area 51 which is configured to store the character information, a parameter buffer area 52 which is configured to store the printing format information and a command buffer area 53 which is configured to store the printing control command, wherein after the printer is powered on, the printing format information received by the controller is stored in the parameter buffer area of the RAM memory; after the printing device is powered off, the data saved in the parameter buffer area 52 is cleared. The FLASH memory 6 is electrically connected with the controller 1 to save the configuration parameter of each mechanism of the printing device, for example, printing speed, printing density, printing format information and paper-saving parameter information. The printing format information includes character height, character interval, character pattern, blank space height and the like; further, the blank space height also includes margin-top, margin-bottom, line spacing and other parameter; wherein, the FLASH memory 6 also can save the blank space height only; the paper-saving parameter information refers to the information used for reducing the blank space height and can include a paper-saving mode and a paper-saving proportion.

The printing control method in the embodiment of the disclosure is described below; it should be noted that the printing control method in the embodiment of the disclosure can be implemented by but not limited to the printing device provided by the embodiment of the disclosure.

Figure 2:
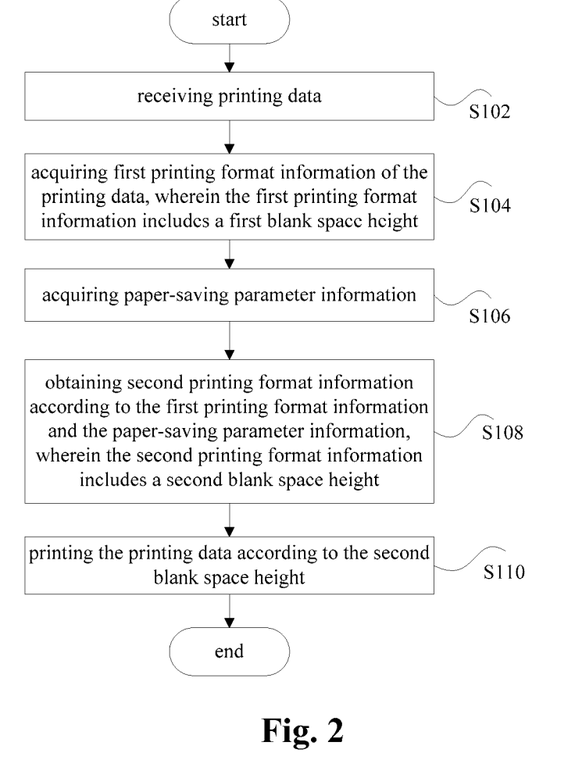
FIG. 2 shows a flowchart of a first embodiment of a printing control method according to the disclosure.

FIG. 2 shows a flowchart of a first embodiment of a printing control method according to the disclosure; as shown in FIG. 2, the method includes the following steps:

Step S102, receiving printing data.

Step S104, acquiring first printing format information of the printing data.

The first printing format information includes a first blank space height; and the first blank space height can include any one or more information of margin-top, line spacing and margin-bottom.

Step S106, acquiring paper-saving parameter information, wherein the paper-saving parameter information may be the paper-saving parameter information stored in a printing device in advance, or may be the paper-saving parameter information determined according to the information input by a user.

Step S108, obtaining second printing format information according to the first printing format information and the paper-saving parameter information.

The second printing format information includes a second blank space height. Correspondingly, the second blank space height also can include any one or more information of margin-top, line spacing and margin-bottom. Since the second printing format information is calculated through the paper-saving parameter information based on the first printing format information, the blank space height corresponding to the second printing format information is less than that corresponding to the first printing format information.

Step S110, printing the printing data according to the second blank space height.

In this embodiment, the blank space height information in the first printing format information is changed according to the acquired paper-saving parameter information, then, printing operation is executed according to the changed blank space height information, that is, the second blank space height, therefore, the disclosure can greatly reduce the consumption of printing paper by reducing the length of blank paper without narrowing characters.

Figure 3:
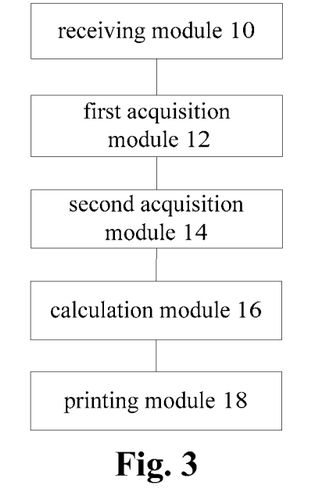
FIG. 3 shows a diagram of a printing control device according to the embodiment of the disclosure.

FIG. 3 shows a diagram of a printing control device according to the embodiment of the disclosure. As shown in FIG. 3, the printing control device includes a receiving module 10, a first acquisition module 12, a second acquisition module 14, a calculation module 16 and a printing module 18.

The receiving module 10 is configured to receive printing data; the first acquisition module 12 is configured to acquire first printing format information of the printing data, wherein the first printing format information includes a first blank space height; the second acquisition module 14 is configured to acquire paper-saving parameter information; the calculation module 16 is configured to obtain second printing format information according to the first printing format information and the paper-saving parameter information, wherein the second printing format information includes a second blank space height; and the printing module 18 is configured to print the printing data according to the second blank space height.

Figure 4:
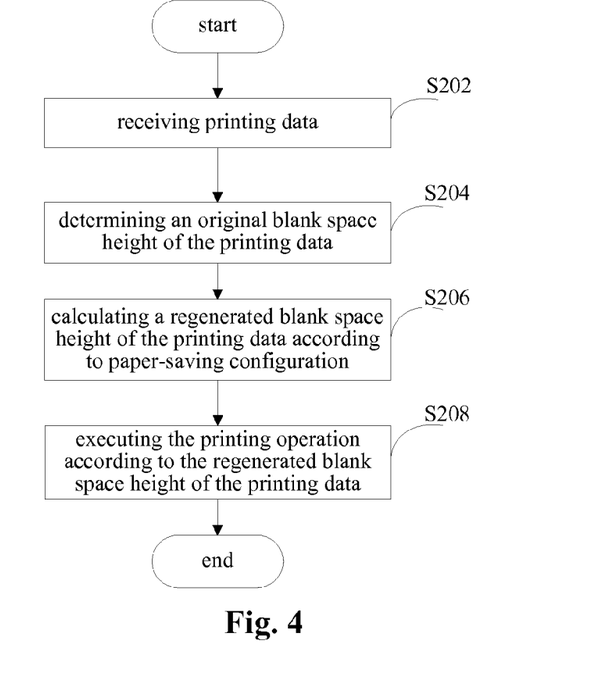
FIG. 4 shows a flowchart of a second embodiment of a printing control method according to the disclosure.

FIG. 4 shows a flowchart of a second embodiment of a printing control method according to the disclosure; and the printing control method includes the following steps:

Step S202, receiving printing data.

A printing device receives the printing data transmitted by an external control device such as a host, and stores the printing data to a RAM memory temporarily.

Step S204, determining first printing format information of the printing data, wherein the first printing format information includes an original blank space height (that is, first blank space height).

A controller of the printing device analyzes the printing data, and determines the original blank space height in the printing data. The original blank space height in the printing data includes original margin-top (that is, margin-top of the first blank space height), original line spacing (that is, line spacing of the first blank space height) and original margin-bottom (that is, margin-bottom of the first blank space height), wherein the original line spacing is equal to the difference between original line height and original character height.

Generally, the printing format information is not the necessary content of the printing data; if the printing data includes the printing format information, the margin-top, margin-bottom and line height of the printing data can be acquired from the printing format information, and correspondingly, the original margin-top, the original margin-bottom and the original line spacing are obtained.

If the printing data does not include the printing format information, in the condition that current printing is the first printing executed by the printer since the printer is powered on, the original blank space height of the printing data can be obtained by reading the printing format attribute stored in the FLASH memory; otherwise, the printing device follows the printing format of a last printing task, that is, reads the printing format information of the last printing task from a parameter buffer area of the RAM memory and acquires the original blank space height.

Step S206, calculating second printing format information of the printing data according to paper-saving parameter information, wherein the second printing format information includes a regenerated blank space height, that is, a recalculated blank space height.

The controller of the printing device calculates the regenerated blank space height (that is, the second blank space height) of the printing data according to a paper-saving mode and a paper-saving proportion corresponding to the paper-saving mode in the paper-saving parameter information, which includes regenerated margin-top (that is, margin-top of the second blank space height), regenerated line spacing (that is, line spacing of the second blank space height) and regenerated margin-bottom (that is, margin-bottom of the second blank space height). An operator can preset the paper-saving parameter information, which includes a paper-saving mode and a paper-saving proportion corresponding to the paper-saving mode, through an input device such as host control software or printer key, wherein the paper-saving mode can be one or a combination of a plurality of modes of margin-top paper-saving mode, margin-bottom paper-saving mode and line spacing paper-saving mode. After the paper-saving mode is determined, the paper-saving proportion corresponding to the paper-saving mode can be set as needed, wherein the paper-saving proportion can be any value from 0 to 100%, for example, 100%, 75%, 25% or 0. The regenerated margin-top is equal to Original Margin-Top*(1—Paper-Saving Proportion), the regenerated line spacing is equal to Original Line Spacing*(1—Paper-Saving Proportion), and the regenerated margin-bottom is equal to Original Margin-Bottom*(1—Paper-Saving Proportion). For example, when the paper-saving proportion corresponding to the margin-top paper-saving mode is 100%, the regenerated margin-top is equal to 0. When the paper-saving proportion corresponding to the line-spacing paper-saving mode is 50%, the regenerated line spacing is equal to half of the original line spacing. When the paper-saving proportion corresponding to the margin-bottom paper-saving mode is 25%, the regenerated margin-bottom is equal to three-quarter of the original margin-bottom. When the paper-saving proportion of each paper-saving mode is 0, the regenerated blank space height of the printing data is equal to the original blank space height.

Step S208, executing the printing operation according to the second printing format information of the printing data.

Specifically, the controller controls a driving mechanism and a conveying roller to act according to the regenerated blank space height (that is, the second blank space height) in the second printing format information, and execute the printing operation.

According to the paper-saving parameter information, the original blank space height in the printing data is reduced based on a pre-set proportion to generate a regenerated blank space height, and the printing operation is executed according to the regenerated blank space height. Therefore, the consumption of printing paper is greatly reduced by reducing the length of blank paper without narrowing characters.

Figure 5:
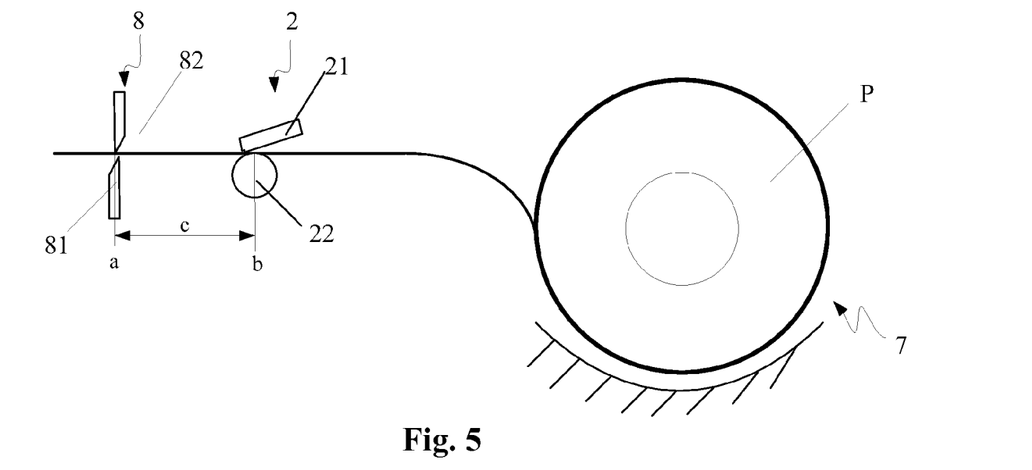
FIG. 5 shows a diagram of a printing device according to an embodiment of the disclosure.

FIG. 5 shows a diagram of a printing device according to an embodiment of the disclosure. In this embodiment, the printing mechanism is a thermal printing mechanism, and the printing paper is rolled paper. As shown in FIG. 5, a paper house 7 of the printing device is used for depositing rolled paper P. The direction of conveying the printing paper from the inside of the paper house 7 to the outside of the paper house 7 is called a paper feed direction, and on the contrary, the direction of conveying the printing paper from the outside of the paper house 7 to the inside of the paper house 7 is called a paper retreating direction. Along the paper feed direction, the printing mechanism 2 is downstream of the paper house 7, including a printing head 21 and a platen 22 set opposite the printing head 21, wherein a plurality of heating elements which are linearly arrayed along the width direction of printing medium is provided on the printing head 21 to heat the printing medium so as to form images or characters. A driving motor is in transmission connection with the platen 22 to drive the platen 22 to rotate. It should be noted that since the platen 22 can be used to convey the printing paper in this embodiment, the platen 22 serves as a conveying roller in this embodiment. In other embodiments of the disclosure, if the printing device is a dot matrix printer, an ink jet, a laser printing device or other types of printing device, a conveying mechanism used for conveying the printing paper needs to be set separately.

Along the paper feed direction, a cutting mechanism 8 is downstream of the printing mechanism 2 to cut off the printing paper, so as to separate the used printing paper from the unused printing paper. The cutting mechanism 8 includes a movable blade 81 and a fixed blade 82 which are set oppositely, wherein a driving device of the movable blade 81 is electrically connected with the controller 1. When receiving a cutting command, the controller 1 controls the movable blade 81 to move towards the fixed blade 82 to cut off the printing paper. During the printing process, the printing paper passes in turn between the printing head 21 and the platen 22, and between the movable blade 81 and the fixed blade 82. The controller 1 controls the printing head 21 to operate in accordance with the printing data, while controlling the driving motor to drive the platen 22 to rotate so as to convey the printing paper forwards. If the printing head operates during the moving forward process of the printing paper, characters are formed on the printing paper; and if the printing head does not operate during the moving forward process of the printing paper, blank space is formed on the printing paper.

Figure 6:
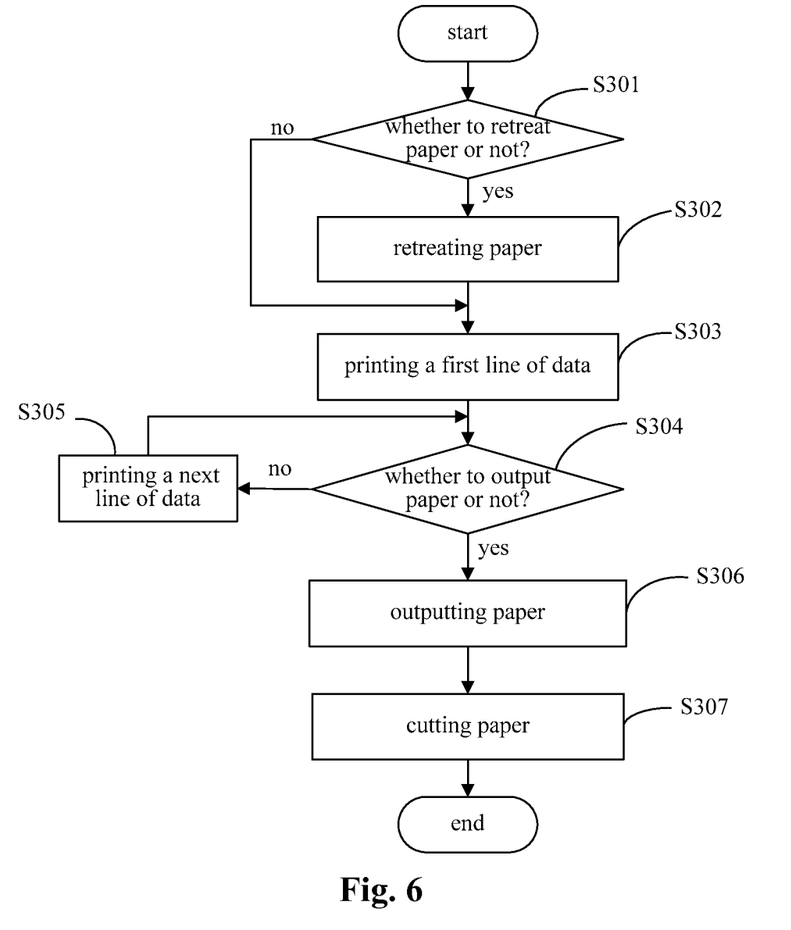
FIG. 6 shows a flowchart of the printing process of the printing device shown in FIG. 5.
Figure 7:
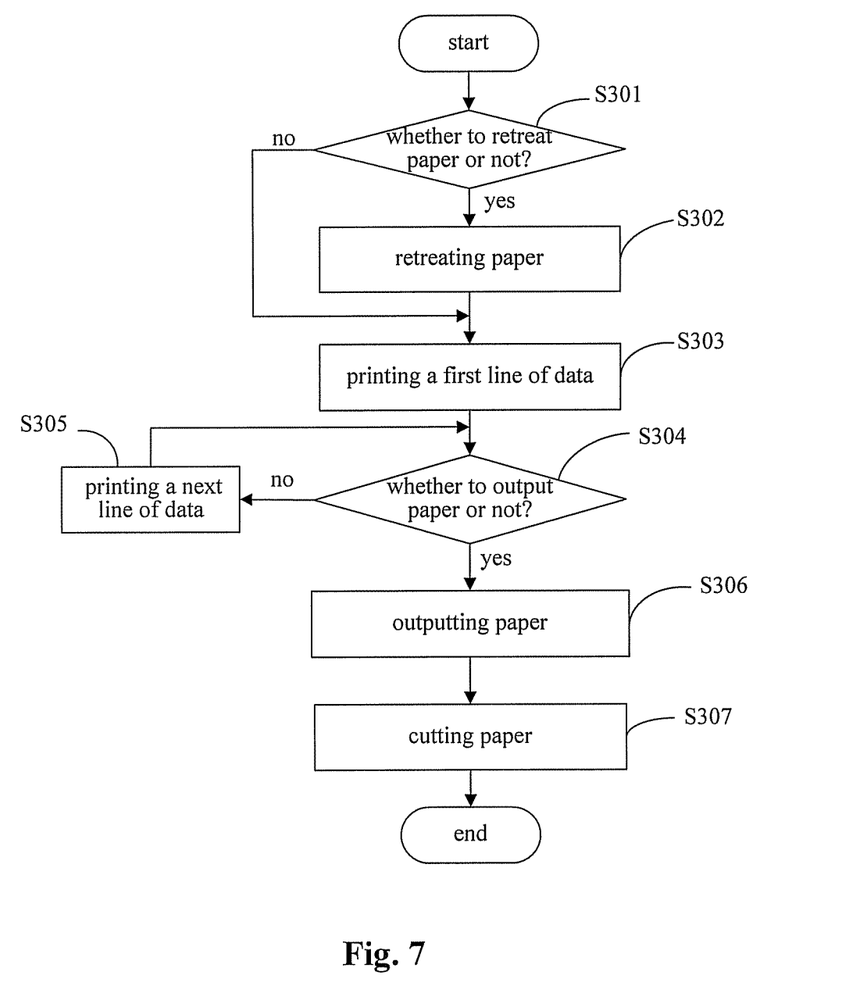

FIG. 6 shows a flowchart of the printing process of the printing device shown in FIG. 5.

Step S301, determining whether to retreat paper or not, if so, executing Step S302, otherwise, executing Step S303.

Along the paper feed direction, the cutting mechanism is downstream of the printing mechanism, and a pre-set distance exists between the cutting mechanism and the printing mechanism. For a convenient description, the distance between a cutting position a of the cutting mechanism and a printing position b of the printing mechanism is called a first distance c. In order to prevent the cutting mechanism from cutting the printed characters, the printing paper on which the printing is completed must move forwards by the first distance c to reach the cutting position before being cut, therefore, a segment of blank printing paper of which the length is equal to the first distance c exists between the cutting position a and the printing position b. Therefore, a default margin-top of the printing device generally is equal to the first distance c.

Comparing the regenerated margin-top with the original margin-top, when the regenerated margin-top is less than the original margin-top, Step S302 is executed to retreat the blank printing paper which is located between the cutting position and the printing position along the paper retreating direction, otherwise, Step S303 is executed, the printing paper is fed to print.

Step S302, retreating paper.

When the regenerated margin-top is less than the original margin-top, the blank printing paper which is located between the cutting position a and the printing position b needs to be retreated to the printing position along the paper retreating direction, wherein the retreating distance is equal to the difference between the first distance and the regenerated margin-top. The controller controls the driving motor to rotate reversely so that the conveying roller conveys the printing paper along the paper retreating direction, when the conveying distance is equal to the retreating distance, the controller controls the driving motor to stop rotating.

Step S303, printing a first line of data.

The controller controls the driving motor to rotate forwards so that the conveying roller conveys the printing paper along the paper feed direction to print the first line. Since each line on the printing paper consists of characters and line spacing, the paper feed distance of each line is equal to the line height, that is, the sum of character height and line spacing. During the printing process, the controller controls the driving motor to feed paper while controlling the printing head to operate, wherein the paper feed distance for printing one line of characters is equal to the character height; after one line of characters are printed, the printing head stops operating, and the controller continues controlling the driving motor to feed paper, wherein the paper feed distance is equal to the regenerated line spacing.

Step S304, determining whether to output paper or not, if so, executing Step S306, otherwise, executing Step S305.

It is determined whether a next line of printing data is a paper output command, if the next line of printing data is a paper output command, Step S306 is executed to convey the printing paper to the cutting position, otherwise, Step S305 is executed to continue printing the next line of data. Or, it is determined whether the command to be executed is a paper output command, in the condition that the command to be executed is a paper output command, Step S306 is executed, and otherwise, Step S305 is executed to continue printing the next line of data.

It should be noted that the paper output command in this step contains the cutting command at the same time, in the condition that the printing device includes a cutting mechanism, the paper output command generally is a cutting command. In the condition that the printing device does not include a cutting mechanism, the cutting command also can be used to indicate the printer to convey paper to a pre-set position.

Step S305, printing a next line of data.

The controller controls the printing head and the driving mechanism to print one line of data according to the character information stored in a buffer memory. Repeat this step until all data is printed.

Step S306, outputting paper.

The controller controls the driving motor to rotate, so that the conveying roller drives the printing paper to move towards the cutting mechanism by a pre-set distance to stop, wherein the conveying distance is equal to the sum of the distance between the printing position and the cutting position and the regenerated margin-bottom.

In the condition that the printing device does not includes a cutting mechanism, a user can directly tear off the printing paper after the printing paper is output, and in this case, a paper tearing blade might be provided at the paper exit, wherein the cutting position is the position where the paper tearing blade is located. Therefore, the distance from the final line to the tearing position is equal to the regenerated margin-bottom, thus, a paper-saving effect can be achieved.

Optionally, in the condition that the printing device includes a cutting mechanism, the method further includes:

Step S307: cutting paper.

The controller controls the cutting mechanism to cut off the printing paper after printing so that the printed-paper is separated from the paper roll, therefore, the distance from the final line to the cutting position is equal to the regenerated margin-bottom.

From the description above, it can be seen that a significant paper-saving effect is achieved during printing process, and furthermore, the consumption of printing paper is greatly reduced by reducing the length of blank paper without narrowing characters.

The above are only the preferred embodiments of the disclosure and not intended to limit the disclosure. For those skilled in the art, various modifications and changes can be made to the disclosure. Any modification, equivalent substitute and improvement made within the spirit and principle of the disclosure are deemed to be included within the scope of protection of the disclosure.

The invention claimed is:
1. A printing control method, comprising:
receiving printing data;
acquiring first printing format information of the printing data, wherein the first printing format information includes a first blank space height;
acquiring paper-saving parameter information;
obtaining second printing format information according to the first printing format information and the paper-saving parameter information, wherein the second printing format information includes a second blank space height; and
printing the printing data according to the second blank space height,
wherein the first blank space height and the second blank space height comprise respectively any one or more of the following:
margin-top, line spacing and margin-bottom,
wherein printing the data according to the second blank space height comprises:
determining whether the margin-top included in the second blank space height is less than a first distance, wherein the first distance refers to a distance between a printing position and a cutting position; and when the margin-top included in the second blank space height is less than the first distance, retreating a printing paper, wherein a distance of retreating the printing paper is equal to the difference between the first distance and the margin-top included in the second blank space height, or
determining whether a command to be executed is a paper output command; in the condition that the command to be executed is the paper output command, conveying the printing paper by a second distance, wherein the second distance is equal to the sum of the margin-bottom included in the second blank space height and the first distance, or
printing a first line of characters; and printing a second line of characters after controlling a printing paper to be conveyed forwards by a third distance, wherein the third distance refers to the line spacing included in the second blank space height.

2. The priming control method according to claim 1, wherein acquiring the paper-saving parameter information comprises:
acquiring pre-stored paper-saving parameter information; or
determining the paper-saving parameter information according to information input by a user.

3. A printing control device, comprising: a receiving module, which is configured to receive printing data; a first acquisition module, which is configured to acquire first printing format information of the printing data, wherein the first printing format information includes a first blank space height;
a second acquisition module, which is configured to acquire paper-saving parameter information;
a calculation module, which is configured to obtain second printing format information according to the first printing format information and the paper-saving parameter information, wherein the second printing format information includes a second blank space height; and
a printing module, which is configured to print the printing data according to the second blank space height,
wherein the first blank space height and the second blank space height comprise respectively any one or more of the following:
first distance, wherein the first distance refers to a distance between a printing position and a cutting position; and when the margin-top included in the second blank space height is less than the first distance, retreat a printing paper, wherein a distance of retreating the printing paper is equal to the difference between the first distance and the margin-top included in the second blank space height, or
determine whether a command to be executed is a paper output command; in the condition that the command to be executed is the paper output command, convey the printing paper by a second distance, wherein the second distance is equal to the sum of the margin-bottom included in the second blank space height and the first distance, or
print a first line of characters; and print a second line of characters after controlling a printing paper to be conveyed forwards by a third distance, wherein the third distance refers to the line spacing included in the second blank space height.

4. A printing device, comprising:
a printing mechanism, which is configured to execute a printing operation, wherein the printing device further comprises:
a controller, which is configured to: receive printing data, acquire first printing format information of the printing data and paper-saving parameter information, wherein the first printing format information includes a first blank space height; obtain second printing format information according to the first printing format information and the paper-saving parameter information, wherein the second printing format information includes a second blank space height; and control the printing mechanism to print the printing data according to the second blank space height,
and further comprising:
a conveying mechanism, which is configured to convey printing paper; and
a driving mechanism, which is configured to supply driving force to the conveying mechanism;
wherein the controller is further configured to:
determine whether a margin-top included in the second blank space height is less than a first distance, and to control the conveying mechanism to retreat a printing paper when the margin-top included in the second blank space height is less than the first distance, wherein the first distance refers to a distance between a printing position and a cutting position, and a distance of retreating the printing paper is equal to the difference between the first distance and the margin-top included in the second blank space height, or
determine whether a paper output command is to be executed, and to control the conveying mechanism to convey the printing paper forwards by a second distance in the condition that the paper output command needs to be executed, wherein the second distance is equal to the sum of a margin-bottom included in the second blank space height and the first distance, or
print a first line of characters, and to print a second line of characters after controlling the conveying mechanism to convey the printing paper forwards by a third distance, wherein the third distance refers to a line spacing included in the second blank space height.

5. The printing device according to claim 4, further comprising: a cutting mechanism, which is configured to cut the printing paper, wherein the controller is further configured to determine whether a cutting command is to be executed, and to convey the printing paper by the second distance in the condition that the cutting command needs to be executed, and then to control the cutting mechanism to cut the printing paper, wherein the second distance is equal to the sum of the margin-bottom included in the second blank space height and a distance between the printing position and the cutting position.

* * * * *